US012277815B2

(12) United States Patent
Hwang

(10) Patent No.: US 12,277,815 B2
(45) Date of Patent: Apr. 15, 2025

(54) VEHICLE OCCUPANT VERIFICATION METHODS AND SYSTEMS

(71) Applicants: Hyundai Motor Company, Seoul (KR); Kia Corporation, Seoul (KR)

(72) Inventor: Duhyun Hwang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 260 days.

(21) Appl. No.: 17/969,053

(22) Filed: Oct. 19, 2022

(65) Prior Publication Data

US 2023/0146751 A1 May 11, 2023

(30) Foreign Application Priority Data

Nov. 5, 2021 (KR) ........................ 10-2021-0151115

(51) Int. Cl.
*G07C 5/10* (2006.01)

(52) U.S. Cl.
CPC ...................................... *G07C 5/10* (2013.01)

(58) Field of Classification Search
CPC ........................................................ G07C 5/10
See application file for complete search history.

(56) References Cited

FOREIGN PATENT DOCUMENTS

WO WO-2013074867 A2 * 5/2013 ............. B60K 35/00

* cited by examiner

*Primary Examiner* — Michael D Lang
(74) *Attorney, Agent, or Firm* — Fox Rothschild LLP

(57) ABSTRACT

Disclosed are a vehicle and a vehicle occupant check method. The vehicle occupant check method comprises checking whether a vehicle occupant is inside a vehicle based on a first preset condition, comprising checking a presence of the vehicle occupant inside the vehicle through a detection sensor, when a current driver of the vehicle matches an existing driver, and a driving pattern of the current driver matches a driving pattern of the existing driver. The vehicle occupant check method further comprises checking whether the vehicle occupant is inside the vehicle based on a second condition, comprising checking a presence of the vehicle occupant inside the vehicle through a detection sensor, when the current driver of the vehicle does not match the existing driver, or the driving pattern of the current driver does not match the driving pattern of the existing driver.

16 Claims, 5 Drawing Sheets

VEHICLE OCCUPANT VERIFICATION METHODS AND SYSTEMS

CROSS-REFERENCE TO RELATED APPLICATION(S)

This application claims, under 35 U.S.C. § 119(a), the benefit of Korean Patent Application No. 10-2021-0151115, filed on Nov. 5, 2021, in the Korean Intellectual Property Office, the disclosure of which is incorporated herein by reference in its entirety.

BACKGROUND

Technical Field

Embodiments of the present disclosure relate to verifying a vehicle occupant, and more particularly, to methods and systems for verifying a vehicle occupant based on confirmation with the vehicle driver.

Background

When a driver finishes driving and exits a vehicle, even though an occupant in a front or rear seat has not been able to exit the vehicle, the driver may leave the vehicle with the vehicle doors locked.

When a vehicle occupant is left in the vehicle without protection from others, in a situation that requires the protection of others, a problem may occur for the vehicle occupant.

SUMMARY

It is an aspect of the disclosure to perform a vehicle occupant check by dividing into a vehicle occupant check mode under a normal condition and a vehicle occupant check mode under an enhanced condition based on driver identification and driving pattern analysis.

Additional aspects of the disclosure will be set forth in part in the description which follows and, in part, will be obvious from the description, or may be learned by practice of the disclosure.

In accordance with an aspect of the disclosure, a vehicle occupant check method of a vehicle comprises checking whether a vehicle occupant is inside the vehicle, based on a first preset condition, when a current driver of the vehicle matches an existing driver and a driving pattern of the current driver matches a driving pattern of the existing driver, and checking whether the vehicle occupant is inside the vehicle based on a second condition that may be more enhanced than the first condition, when the current driver of the vehicle does not match the existing driver or the driving pattern of the current driver does not match the driving pattern of the existing driver.

The method may further comprise checking whether the current driver matches the existing driver through a specific setting for each driver registered in a memory system of the vehicle.

The method may further comprise checking whether the current driver matches the existing driver through biometric information for each driver registered in a biometric recognition device of the vehicle.

The method may further comprise checking whether the driving pattern of the current driver matches the driving pattern of the existing driver through a difference in driving time between the current driver and the existing driver.

The method may further comprise checking whether the driving pattern of the current driver matches the driving pattern of the existing driver through a difference in driving speed between the current driver and the existing driver.

The method may further comprise checking whether the driving pattern of the current driver matches the driving pattern of the existing driver through a difference in a number of sudden braking or rapid acceleration between the current driver and the existing driver.

The method may further comprise checking whether the driving pattern of the current driver matches the driving pattern of the existing driver through a difference in driving route between the current driver and the existing driver.

The checking of a vehicle occupant based on the first condition may comprise checking the presence of an occupant inside the vehicle through a detection sensor.

The checking of a vehicle occupant based on the second condition may comprise checking the presence of an occupant inside the vehicle through a detection sensor, wherein a sensitivity of the detection sensor in the second condition may be higher than a sensitivity of the detection sensor in the first condition.

A possibility of detecting the vehicle occupant may be greater in the second condition than in the first condition.

In accordance with an aspect of the disclosure, a vehicle may comprise a detection sensor configured to detect whether a vehicle occupant is present inside the vehicle, and a controller configured to check whether a vehicle occupant is inside the vehicle, based on a first preset condition, when a current driver of the vehicle matches an existing driver and a driving pattern of the current driver matches a driving pattern of the existing driver, and the controller may further be configured to check whether the vehicle occupant is inside the vehicle, based on a second condition that may be more enhanced than the first condition, when the current driver of the vehicle does not match the existing driver or the driving pattern of the current driver does not match the driving pattern of the existing driver.

The controller may be configured to check whether the current driver matches the existing driver through a specific setting for each driver registered in a memory system of the vehicle.

The controller may be configured to check whether the current driver matches the existing driver through biometric information for each driver registered in a biometric recognition device of the vehicle.

The controller may be configured to check whether the driving pattern of the current driver matches the driving pattern of the existing driver through a difference in driving time between the current driver and the existing driver.

The controller may be configured to check whether the driving pattern of the current driver matches the driving pattern of the existing driver through a difference in driving speed between the current driver and the existing driver.

The controller may be configured to check whether the driving pattern of the current driver matches the driving pattern of the existing driver through a difference in a number of sudden braking or rapid acceleration between the current driver and the existing driver.

The controller may be configured to check whether the driving pattern of the current driver matches the driving pattern of the existing driver through a difference in driving route between the current driver and the existing driver.

The checking of a vehicle occupant based on the first condition may comprise checking the presence of an occupant inside the vehicle through the detection sensor.

The checking of a vehicle occupant based on the second condition may comprise checking the presence of an occupant inside the vehicle through the detection sensor, wherein a sensitivity of the detection sensor in the second condition may be higher than a sensitivity of the detection sensor in the first condition.

A possibility of detecting the vehicle occupant may be greater in the second condition than in the first condition.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
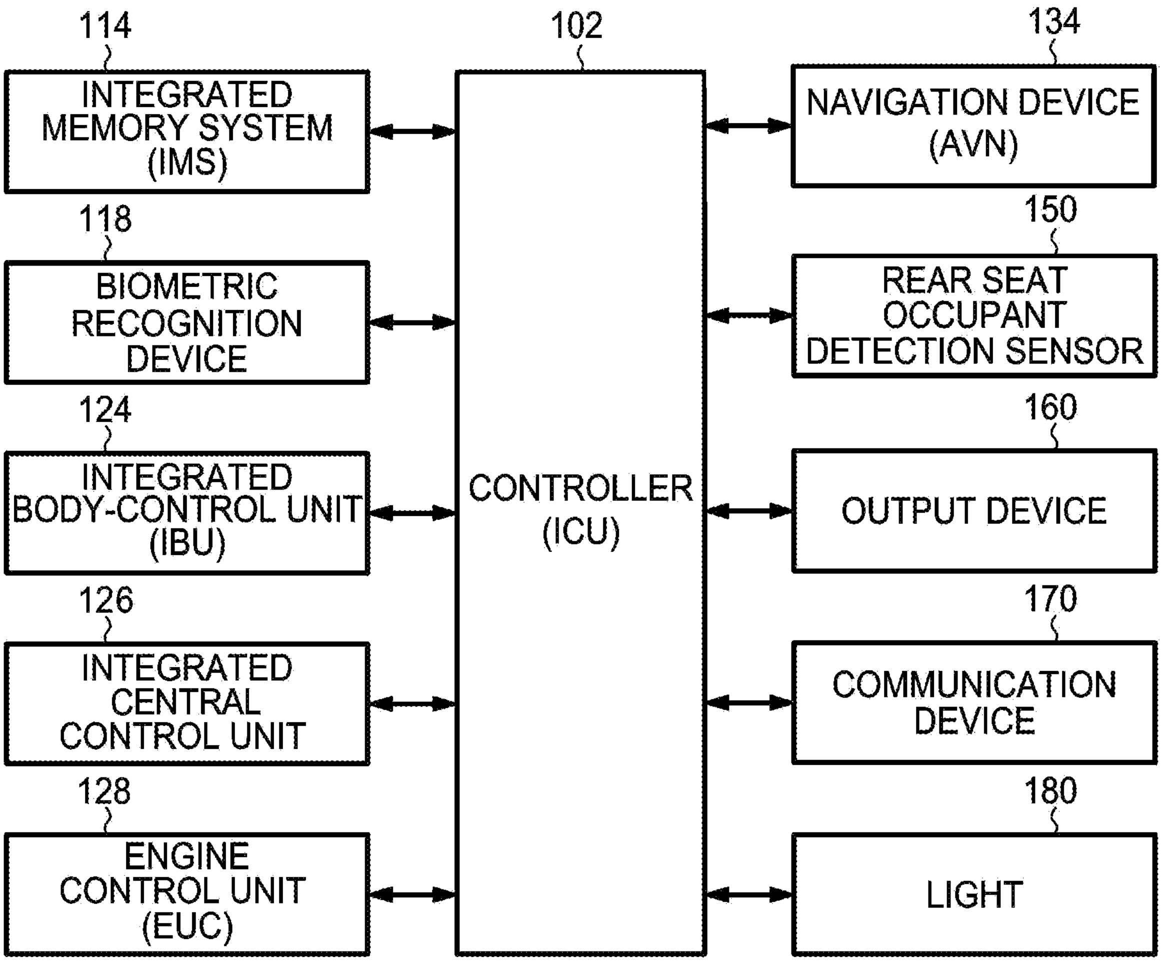
FIG. 1 is a diagram illustrating a control system of a vehicle according to an exemplary embodiment of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

FIG. 1 is a diagram illustrating a control system of a vehicle according to an exemplary embodiment of the disclosure.

As illustrated in FIG. 1, an integrated memory system 114, a biometric recognition device 118, an integrated body-control unit 124, an engine control unit 128, a navigation (AVN) device 134 a rear seat occupant detection sensor 150, an output device 160, a communication device 170, and a light 180 are connected to a controller 102 to be able to communicate.

The controller 102 may be an integrated central-control unit (ICU).

The integrated memory system (IMS) 114 may be configured to set a driver seat position, a mirror position, and a steering wheel position of a vehicle to unique values for each registered driver. That is, because a husband and wife may have different heights and different preferred driving postures when the husband and wife share one vehicle, the husband and wife each register the driver seat position, the mirror position, and the steering wheel position in the integrated memory system 114, and in the future, when it is checked that the driver corresponds to the husband or wife through driver authentication, a driver seat, a mirror, and a steering wheel of the vehicle are automatically adjusted to the pre-registered driver seat position, mirror position, and steering wheel position of the corresponding driver. Therefore, it may be checked who the corresponding driver is among the registered drivers through the driver seat position, the mirror position, and the steering wheel position.

The biometric recognition device 118 may be configured to identify a registered driver through biometric information such as a fingerprint and iris. That is, driver registration is performed through a fingerprint or iris, and driver recognition is performed through fingerprint recognition or iris recognition in the future, so that door unlocking or engine starting of the vehicle may be permitted. Therefore, it may be checked who the corresponding driver is among the registered drivers through the biometric recognition.

The integrated body-control unit (IBU) 124 may be configured to detect opening and closing of a vehicle door.

The engine control unit (ECU) 128 may be configured to provide information on starting on/off states of the engine together with starting on/off control of the engine to the controller 102.

The navigation device 134 may be included in a multimedia (audio video navigation; AVN) device of the vehicle, and may be configured to provide information related to driving of the vehicle, such as route guidance history, departure/arrival times, stopovers, and mileage as well as route guidance to a destination, to the controller 102.

The rear seat occupant detection sensor 150 may be configured to detect Whether a vehicle occupant is present in the vehicle (especially in the rear seat). The rear seat occupant detection sensor 150 may be a radar or ultrasonic sensor.

The output device 160 may comprise a display and a speaker of the vehicle. The controller 102 may be configured to output an alarm for notifying the driver of the presence of a vehicle occupant in the vehicle through the output device 160.

The communication device 170 may be configured to perform communication between a mobile device of the driver and the vehicle. The controller 102 may be configured to transmit a text message for notifying the driver of the presence of a vehicle occupant in the vehicle to the mobile device of the driver through the communication device 170.

The light 180 may comprise an emergency light or a headlight of the vehicle, or the like. The controller 102 may be configured to notify the driver of the presence of a vehicle occupant in the vehicle through blinking of the light 180.

In an exemplary embodiment of the disclosure, the controller 102 may be configured to perform the driver identification through at least one of the integrated memory system 114 and the biometric recognition device 118. The controller 102 may be configured to check a departure time of the vehicle by checking an opening time of a rear seat door through the integrated body-control unit 124 and checking an engine starting time through the engine control unit 128. In addition, the controller 102 may be configured to check a speed for each day of the week of the vehicle and a usual moving route through the navigation device 134.

Figure 2:
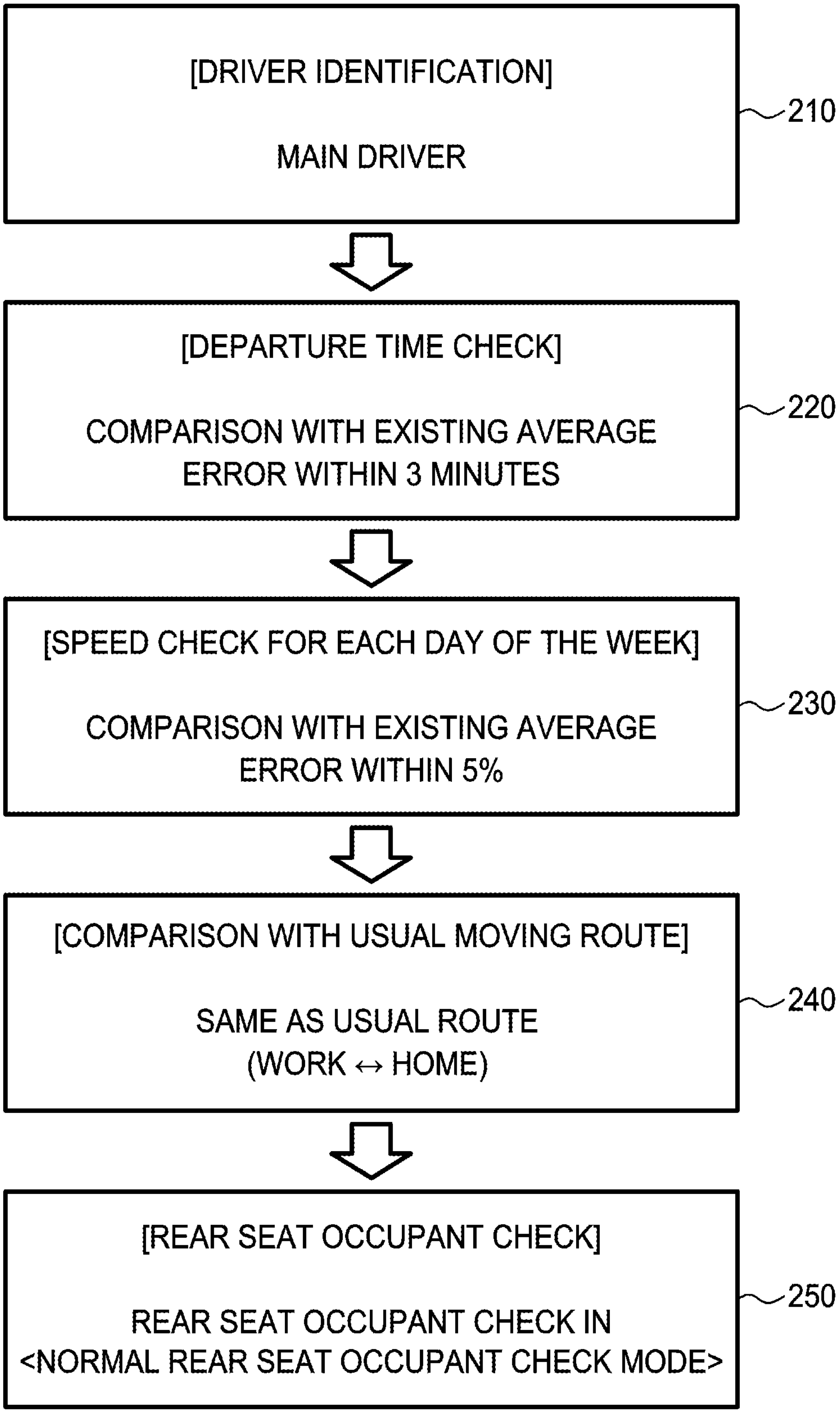
FIG. 2 is a diagram illustrating an example of a normal rear seat occupant check mode of the vehicle according to an exemplary embodiment of the disclosure.
Figure 3:
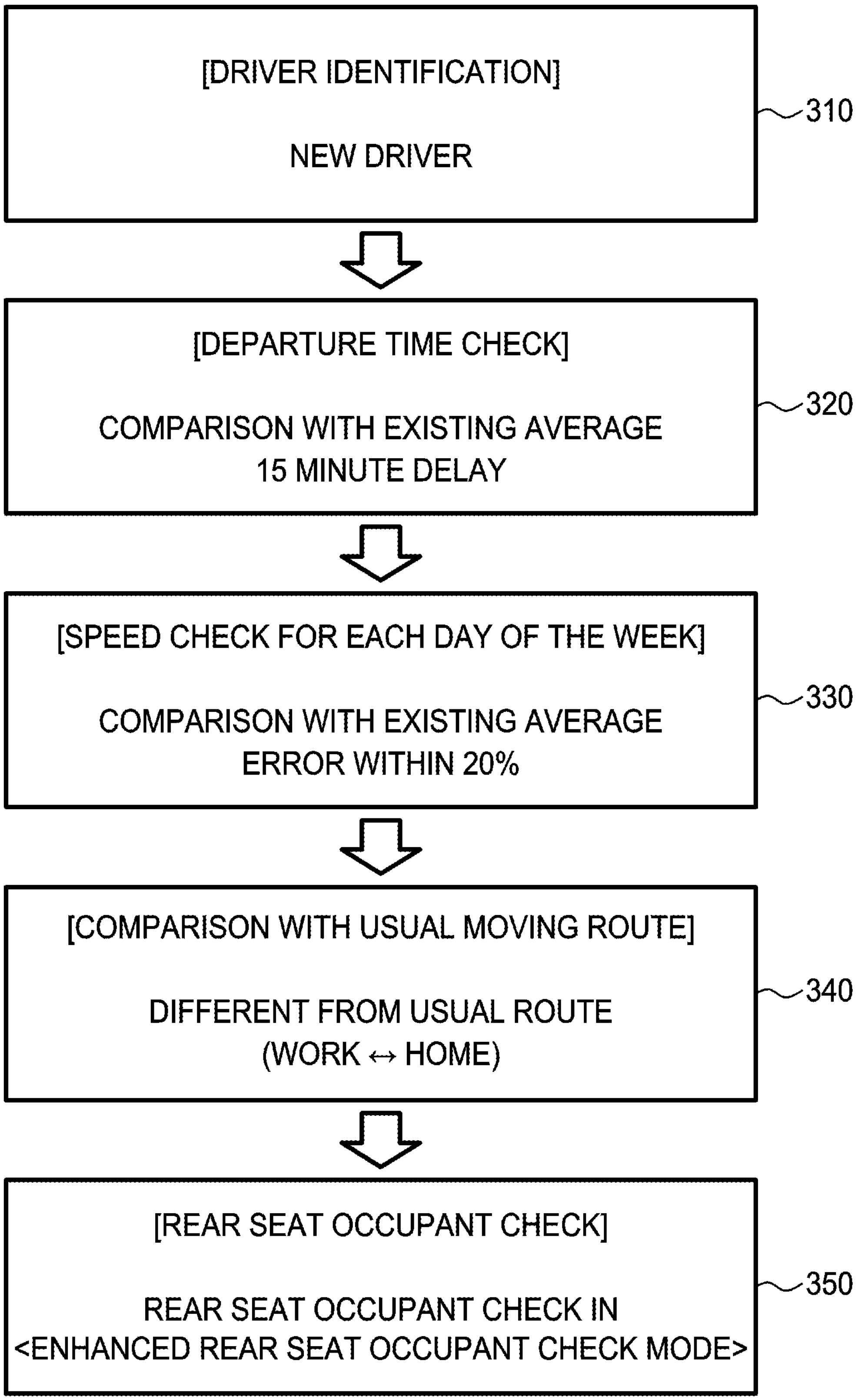
FIG. 3 is a diagram illustrating an example of an enhanced rear seat occupant check mode of the vehicle according to an exemplary embodiment of the disclosure.
Figure 4:
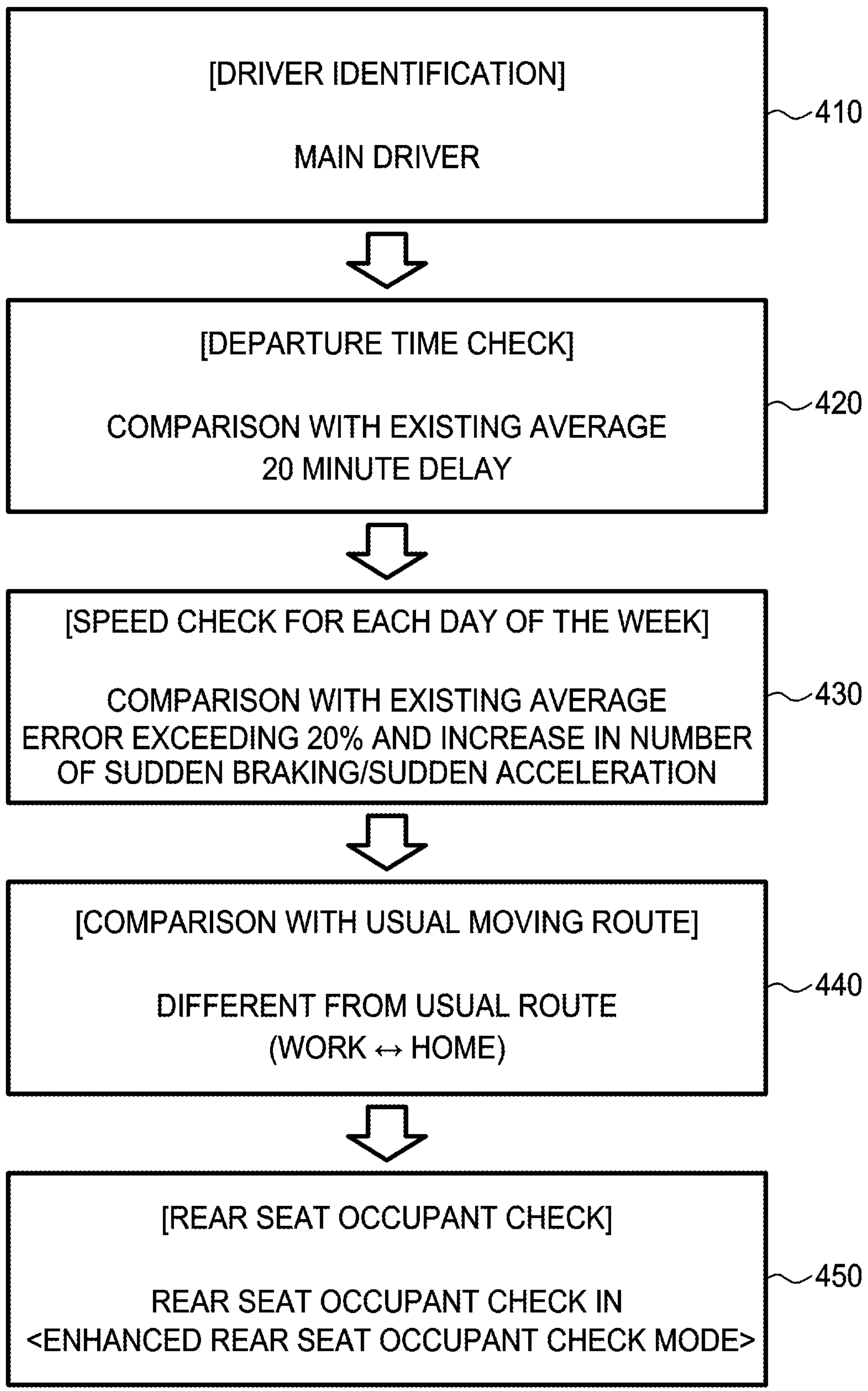
FIG. 4 is a diagram illustrating another example of the enhanced rear seat occupant check mode of the vehicle according to an exemplary embodiment of the disclosure.

FIGS. 2 to 4 are diagrams illustrating various embodiments of determining a rear seat occupant check mode of the vehicle according to an exemplary embodiment of the disclosure. In an exemplary embodiment of the disclosure, the rear seat occupant check mode may be divided into a <normal rear seat occupant check mode> and an <enhanced rear seat occupant check mode>.

The normal rear seat occupant check mode is activated when a main driver of the vehicle drives with an average driving pattern that does not differ from usual. In the normal rear seat occupant check mode, a rear seat occupant check is performed based on a preset default condition (first condition). For example, in the normal rear seat occupant check mode, sensitivity of the rear seat occupant detection sensor 150 is set to an intermediate value (normal level), and the rear seat occupant check is performed in a state in which the door is locked after a rear seat door opening check of the vehicle is performed. When vibration/shock of the vehicle occurs in a state in which the normal rear seat occupant check mode is activated, the rear seat occupant check using the rear seat occupant detection sensor 150 is not performed. Because reliability of the rear seat occupant detection sensor 150 is not very high when vibration/shock of the vehicle occurs, in the normal rear seat occupant check mode, the rear seat occupant check using the rear seat occupant detection sensor 150 is not performed when vibration/shock of the vehicle occurs.

The enhanced rear seat occupant check mode is activated when a new driver other than the existing main driver drives the vehicle, when driving is performed in a different manner than usual, or when a different driving route or a different driving time than usual is checked.

In the enhanced rear seat occupant check mode, the rear seat occupant check is performed based on a more enhanced condition (second condition) than the default condition of the normal rear seat occupant check mode described above. That is, the enhanced condition of the enhanced rear seat occupant check mode means that the detection probability of the rear seat occupant in the enhanced rear seat occupant check mode is more increased than the default condition of the normal rear seat occupant check mode. For example, in the enhanced rear seat occupant check mode, the sensitivity of the rear seat occupant detection sensor 150 is set to a value higher than the intermediate value (normal level), and after the rear door opening check of the vehicle is performed, the rear seat occupant check is performed even in a state in which the door is not locked. In addition, even when vibration/shock of the vehicle occurs, the rear seat occupant check is performed using the rear seat occupant detection sensor 150. Even if the reliability of the rear seat occupant detection sensor 150 is not very high when vibration/shock of the vehicle occurs, in the enhanced rear seat occupant check mode according to an exemplary embodiment of the disclosure, in order to increase the possibility of checking a rear seat occupant even a little, the rear seat occupant check using the rear seat occupant detection sensor 150 is performed even when vibration/shock of the vehicle occurs. In addition, the rear seat occupant check is performed even when the engine is running while the vehicle is stopped.

The rear seat occupant check mode according to an exemplary embodiment of the disclosure is not limited to the <normal rear seat occupant check mode> and the <enhanced rear seat occupant check mode>, and more various rear seat occupant check modes under different conditions may be performed.

FIG. 2 is a diagram illustrating an example of the normal rear seat occupant check mode of the vehicle according to an exemplary embodiment of the disclosure. The embodiment of FIG. 2 corresponds to a case in which an existing driver drives in a usual driving pattern.

As illustrated in FIG. 2, the controller 102 performs [driver identification 210], [departure time check 220], [speed check for each day of the week 230], and [comparison with usual moving route 240] for driver classification and driving pattern analysis of the vehicle, and determines the rear seat occupant check mode based on the result, and then performs [rear seat occupant check 250] in the determined rear seat occupant check mode.

The [driver identification 210] is a process of checking whether a current driver is the main driver who usually mainly drives the corresponding vehicle. When the driver is a driver who usually drives the corresponding vehicle with a relatively high frequency, or the same driver as the previous driver who drove the corresponding vehicle in the previous driving, the corresponding driver may be recognized as the main driver. As mentioned above in the description of FIG. 1, the driver identification may be performed through the driver seat position, the steering wheel position, the mirror position, and the biometric information registered in the biometric recognition device 118 set in the integrated memory system 114. In the case of FIG. 2, the current driver is (matches) the main driver (existing driver).

The [departure time check 220] is a process of checking the time (operation time) when the current driver starts driving the corresponding vehicle. For example, when the vehicle is usually driven (departed) at a relatively fixed time for the purpose of going to work, leaving work, or going to school, a pattern of departure time is checked by comparing the departure time with a new departure time. When an error between an average value of the usual departure time and the new departure time is within a preset time (for example, five minutes), the new departure time may be recognized as the same as the usual departure time. In the case of FIG. 2, because the error between the average value of the usual departure time and the new departure time is within three minutes, it may be recognized as a driving pattern of the same aspect as that of the existing driving pattern.

The [speed check for each day of the week 230] is a process of comparing an average value of driving speed for each day of the week in usual vehicle operation and an average value of the current driving speed. For example, when a husband and wife share one vehicle, but the wife uses (drives) the vehicle on weekdays (Monday-Friday) and the husband uses (drives) the vehicle on weekends, depending on driving styles of the wife and husband, the driving speed may vary by day of the week. That is, when a driving tendency of the wife who uses the vehicle during weekdays is moderate, the average driving speed during weekdays (Monday-Friday) will be relatively low. Conversely, when the husband who uses the vehicle on weekends has a dynamic driving tendency, the average driving speed on weekends will be relatively higher than the average driving speed on weekdays. By comparing the current average driving speed with the average driving speed on the same existing day as the current day of the week, it may be checked whether the driver is the existing driver or a new driver depending on whether the driving speeds are similar. In the case of FIG. 2, because the current average driving speed and the average driving speed on the same existing day as the current day of the week have an error within a preset reference value (for example, 5%), it may be recognized as a driving pattern of the same aspect as that of the existing driving pattern.

The [comparison with usual moving route 240] is a process of checking whether the current moving route is similar to a usual main moving route. For example, when a usual moving route is the same as the current moving route in moving from home to work, it may be recognized that the existing main driver drives in the same manner as (e.g., matches) the existing driving pattern. In the case of FIG. 2, because the current moving route and the existing moving route are the same, it may be recognized as a driving pattern of the same aspect as that of the existing driving pattern.

The [rear seat occupant check 250] is a process of checking whether an occupant that has not gotten off the vehicle is present. In the case of FIG. 2, because the respective processes 210 to 240 represent that the existing main driver drove in substantially the same aspect as that of the existing driving pattern, the controller 102 checks whether a vehicle occupant is present in the vehicle in the <normal rear seat occupant check mode>.

FIG. 3 is a diagram illustrating an example of the enhanced rear seat occupant check mode of the vehicle according to an exemplary embodiment of the disclosure. The embodiment of FIG. 3 is a case in which a new driver drives in a new aspect different from (e.g., does not match) that of the usual driving pattern.

As illustrated in FIG. 3, the controller 102 performs [driver identification 310], [departure time check 320], [speed check for each day of the week 330], and [comparison with usual moving route 340] for the driver classification and driving pattern analysis of the vehicle, and determines the rear seat occupant check mode based on the result, and then performs [rear seat occupant check 350] in the determined rear seat occupant check mode.

The [driver identification 310] is a process of checking whether the current driver is the main driver who usually mainly drives the corresponding vehicle. When the driver is a driver who usually drives the corresponding vehicle with a relatively high frequency, or the same driver as the previous driver who drove the corresponding vehicle in the previous driving, the corresponding driver may be recognized as the main driver. As mentioned above in the description of FIG. 1, the driver identification may be performed through a memory seat position, the mirror position, and the biometric recognition. In the case of FIG. 3, the current driver is a new driver.

The [departure time check 320] is a process of checking the time (departure time) when the current driver starts driving the corresponding vehicle. For example, when the vehicle is usually driven (departed) at a relatively fixed time for the purpose of going to work, leaving work, or going to school, a pattern of departure time is checked by comparing the departure time with a new departure time. When an error between an average value of the usual departure time and the new departure time is within a preset time (for example, five minutes), the new departure time may be recognized as the same as the usual departure time. In the case of FIG. 3, because the error between the average value of the usual departure time and the new departure time is fifteen minutes, it may be recognized as a driving pattern of a new aspect different from that of the existing driving pattern.

The [speed check for each day of the week 330] is a process of comparing an average value of driving speed for each day of the week in a usual vehicle operation and an average value of the current driving speed. For example, when a husband and wife share one vehicle, but the wife uses (drives) the vehicle on weekdays (Monday-Friday) and the husband uses (drives) the vehicle on weekends, depending on driving styles of the wife and husband, the driving speed may vary by day of the week. That is, when a driving tendency of the wife who uses the vehicle during weekdays is moderate, the average driving speed during weekdays (Monday-Friday) will be relatively low. Conversely, when the husband who uses the vehicle on weekends has a dynamic driving tendency, the average driving speed on weekends will be relatively higher than the average driving speed on weekdays. By comparing the current average driving speed with the average driving speed on the same existing day as the current day of the week, it may be checked whether the driver is the existing driver or a new driver depending on whether the driving speeds are similar. In the case of FIG. 3, because the current average driving speed and the average driving speed on the same existing da as the current day of the week have an error of 20% exceeding the preset reference value (for example, 5%), it may be recognized as a driving pattern of a new aspect different from that of the existing driving pattern.

The [comparison with usual moving route 340] is a process of checking whether the current moving route is similar to a usual main moving route. For example, when a usual moving route is the same as the current moving route in moving from home to work, it may be recognized that the existing main driver drives in the same aspect as that of the existing driving pattern. In the case of FIG. 3, because the current moving route and the existing moving route are not the same, it may be recognized as a driving pattern of a new aspect different from that of the existing driving pattern.

The [rear seat occupant check 350] is a process of checking whether an occupant that has not gotten off the vehicle is present. In the case of FIG. 3, because the respective processes 310 to 340 represent that a new driver drives in a driving pattern of a new aspect, the controller 102 checks whether a vehicle occupant is present in the vehicle in the <enhanced rear seat occupant check mode> described above.

FIG. 4 is a diagram illustrating another example of the enhanced rear seat occupant check mode of the vehicle according to an exemplary embodiment of the disclosure. The embodiment of FIG. 4 is a case in which the existing driver drives in a new aspect different from that of the usual driving pattern. That is, the embodiment of FIG. 4 exemplifies a case where the driver drives differently from usual in a special situation different from usual, even though the driver is the same as the existing driver.

[Driver identification 410] is a process of checking whether the current driver is the main driver who usually mainly drives the corresponding vehicle. When the driver is a driver who usually drives the corresponding vehicle with a relatively high frequency, or the same driver as the previous driver who drove the corresponding vehicle in the previous driving, the corresponding driver may be recognized as the main driver. As mentioned above in the description of FIG. 1, the driver identification may be performed through the memory seat position, the mirror position, and the biometric recognition. In the case of FIG. 4, the current driver is the main driver.

[Departure time check 420] is a process of checking the time (departure time) when the current driver starts driving the corresponding vehicle. For example, when the vehicle is usually driven (departed) at a relatively fixed time for the purpose of going to work, leaving work, or going to school, a pattern of departure time is checked by comparing the departure time with a new departure time. When an error between an average value of the usual departure time and the new departure time is within a preset time (for example, five minutes), the new departure time may be recognized as the same as the usual departure time. In the case of FIG. 4, because the error between the average value of the usual departure time and the new departure time is twenty minutes, it may be recognized as a driving pattern of a new aspect different from that of the existing driving pattern.

[Speed check for each day of the week 430] is a process of comparing an average value of driving speed for each day of the week in a usual vehicle operation and an average value of the current driving speed. For example, when a husband and wife share one vehicle, but the wife uses (drives) the vehicle on weekdays (Monday-Friday) and the husband uses (drives) the vehicle on weekends, depending on driving styles of the wife and husband, the driving speed may vary by day of the week. That is, when a driving tendency of the wife who uses the vehicle during weekdays is moderate, the average driving speed during weekdays (Monday-Friday) will be relatively low. Conversely, when the husband who uses the vehicle on weekends has a dynamic driving tendency, the average driving speed on weekends will be relatively higher than the average driving speed on weekdays. By comparing the current average driving speed with the average driving speed on the same existing day as the current day of the week, it may be checked whether the driver is the existing driver or a new driver depending on whether the driving speeds are similar. In the case of FIG. 4, because the current average driving speed and the average driving speed on the same existing day as the current day of the week have an error of 20% exceeding the preset reference value (for example, 5%), and moreover, it is a case where the number of sudden braking/sudden acceleration is greatly increased, it may be recognized as a driving pattern of a new aspect different from that of the existing driving pattern.

[Comparison with usual moving route 440] is a process of checking whether the current moving route is similar to a usual main moving route. For example, when a usual moving route is the same as the current moving route in moving from home to work, it may be recognized that the existing main driver drives in the same aspect as that of the existing driving pattern. In the case of FIG. 4, because the current moving route and the existing moving route are not the same, it may be recognized as a driving pattern of a new aspect different from that of the existing driving pattern.

[Rear seat occupant check 450] is a process of checking whether an occupant that has not gotten off the vehicle is present. In the case of FIG. 4, because the respective processes 410 to 440 represent that the existing main driver drives in a driving pattern of a new aspect different from that of the existing driving pattern, the controller 102 checks whether a vehicle occupant is present in the vehicle in the <enhanced rear seat occupant check mode> described above.

Figure 5:
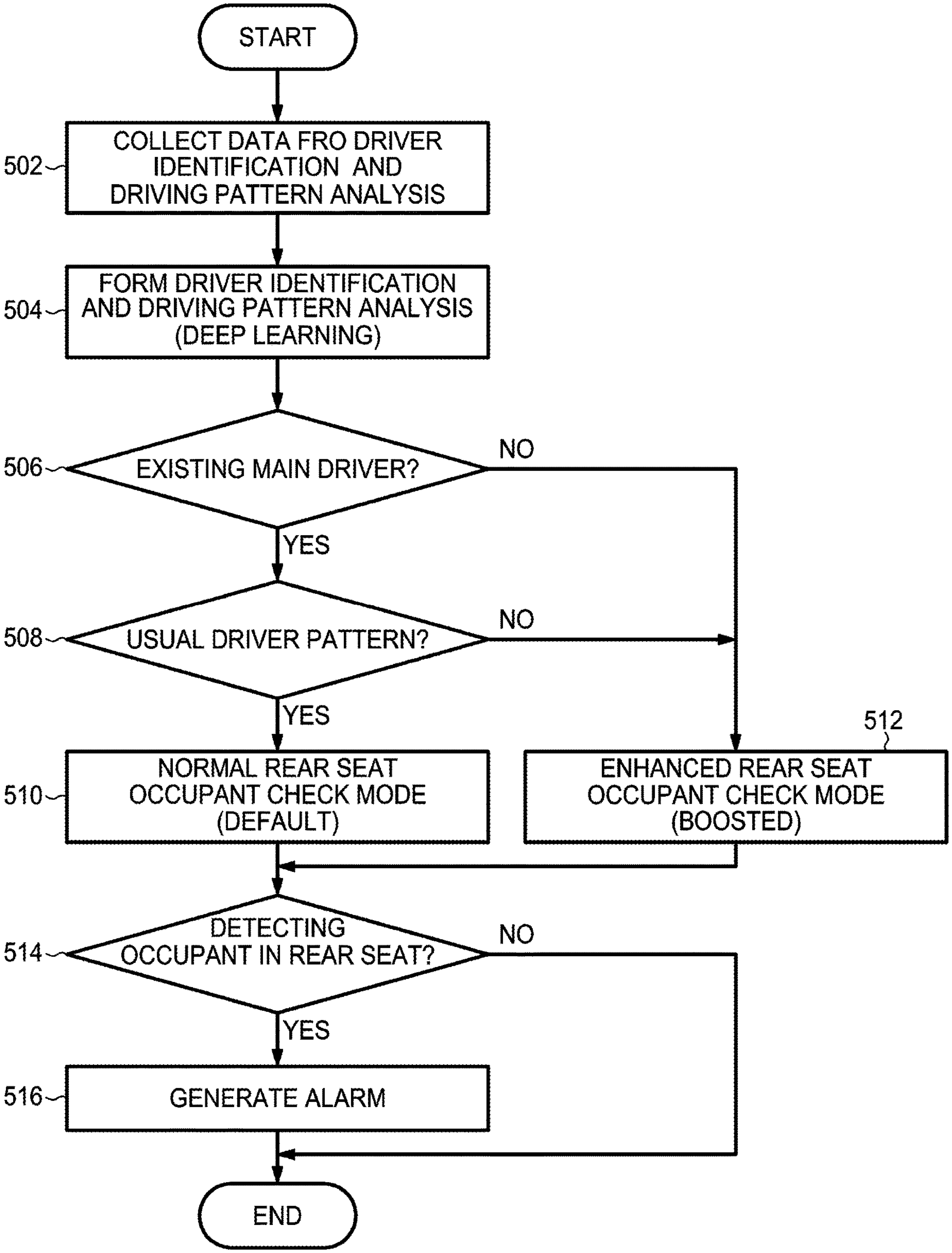
FIG. 5 is a diagram illustrating a vehicle occupant check method of the vehicle according to an exemplary embodiment of the disclosure.

FIG. 5 is a diagram illustrating a vehicle occupant check method of the vehicle according to an exemplary embodiment of the disclosure. In the method illustrated in FIG. 5, the controller 102 performs the rear seat occupant check of the vehicle by selecting any one of the normal rear seat occupant check mode and the enhanced rear seat occupant check mode based on the results of the driver identification and driving pattern analysis.

As illustrated in FIG. 5, the controller 102 collects data for the driver identification and driving pattern analysis (502). As mentioned above in the description of FIG. 1, the controller 102 collects data for the driver identification and driving pattern analysis using the integrated memory system 114, the biometric recognition device 118, the integrated body-control unit 124, the integrated central control unit 126, the engine control unit 128, and the navigation (AVN) device 134.

The controller 102 performs the driver identification and driving pattern analysis by analyzing the collected data through deep learning (504). The driver identification is to check whether the current driver is the same person as the existing main driver. The driving pattern analysis is to check whether the driving pattern of the current driver is the same as the driving pattern of the existing main driver. The driver identification and driving pattern analysis have been described in detail above with reference to FIGS. 1 to 4.

The controller 102 checks whether the current driver is the same as the existing main driver based on the driver identification result (506). When the current driver is the same as the existing main driver ('YES' in 506), the controller 102 checks whether the driving pattern of the current driver is the same as or similar to the usual driving pattern of the existing main driver of the corresponding vehicle (508).

When the current driver is the same as the existing main driver and the driving pattern of the current driver is the same as or similar to the usual driving pattern of the existing main driver of the corresponding vehicle ('YES' in 508), the controller 102 recognizes that the existing main driver is driving according to the usual driving pattern and checks whether an occupant is present in the rear seat in the normal rear seat occupant check mode based on the preset default condition (510). The normal rear seat occupant check mode has been described in detail above with reference to FIGS. 1 and 2.

Contrary to the above, when the current driver is not the same as (e.g., does not match) the existing main driver ('NO' in 506) or when the driving pattern of the current driver is different from the usual driving pattern of the existing main driver of the corresponding vehicle ('NO' in 508), the controller 102 recognizes that the current driver is not the existing main driver or that the current driving pattern is different from the existing usual driving pattern, and checks whether a rear seat occupant is present in the enhanced rear seat occupant check mode based on a preset enhanced condition (512). The enhanced rear seat occupant check mode has been described in detail above with reference to FIGS. 1, 3 and 4.

When the vehicle occupant is detected in the vehicle (especially in the rear seat) in any one of the normal rear seat occupant check mode and the enhanced rear seat occupant check mode ('YES' in 514), the controller 102 generates an alarm to notify the driver that a vehicle occupant is present (516). The alarm for notifying the driver of the presence of vehicle occupant may comprise outputting an alarm sound through the output device 160 or transmitting a text notification to a mobile device of the driver through the communication device 170. In addition, the presence of vehicle occupant may be notified by blinking the light 180 of the vehicle.

As is apparent from the above, according to an aspect of the disclosure, by performing a vehicle occupant check by dividing into a vehicle occupant check mode under a normal condition and a vehicle occupant check mode under an enhanced condition based on driver identification and driving pattern analysis, the possibility of vehicle occupant check can be higher through the vehicle occupant check mode under the enhanced condition in a situation Where a vehicle is used differently than usual.

The embodiments disclosed above are merely illustrative of the technical idea, and various modifications, changes and substitutions may be made by those skilled in the art without departing from the essential characteristics. Therefore, the embodiments and the accompanying drawings are for explanation rather than limiting the technical idea, and the scope of the technical idea is not limited by these embodiments and the accompanying drawings. The scope of protection should be interpreted by the following claims, and all technical ideas within the scope equivalent thereto should be construed as being included in the scope of rights.

What is claimed is:

1. A vehicle occupant check method, comprising:

checking whether a vehicle occupant is inside a vehicle based on a first condition, comprising checking a presence of the vehicle occupant inside the vehicle through a detection sensor, when:

a current driver of the vehicle matches an existing driver; and a driving pattern of the current driver matches a driving pattern of the existing driver; and checking whether the vehicle occupant is inside the vehicle based on a second condition, comprising checking the presence of the vehicle occupant inside the vehicle through the detection sensor, when:

the current driver of the vehicle does not match the existing driver; or the driving pattern of the current driver does not match the driving pattern of the existing driver, wherein a sensitivity of the detection sensor in the second condition is higher than a sensitivity of the detection sensor in the first condition, wherein checking the presence of the vehicle occupant based on the first condition is performed in a state in which a door of the vehicle is locked after a door opening check of the vehicle is performed, and wherein checking the presence of the vehicle occupant based on the second condition is performed in a state in which the door opening check of the vehicle is performed.

2. The vehicle occupant check method according to claim 1, further comprising checking, through a specific setting for each driver registered in a memory system of the vehicle, whether the current driver matches the existing driver.

3. The vehicle occupant check method according to claim 1, further comprising checking, through biometric information for each driver registered in a biometric recognition device of the vehicle, whether the current driver matches the existing driver.

4. The vehicle occupant check method according to claim 1, further comprising checking, through a difference in driving time between the current driver and the existing driver, whether the driving pattern of the current driver matches the driving pattern of the existing driver.

5. The vehicle occupant check method according to claim 1, further comprising checking, through a difference in driving speed between the current driver and the existing driver, whether the driving pattern of the current driver matches the driving pattern of the existing driver.

6. The vehicle occupant check method according to claim 1, further comprising checking, through a difference in a number of sudden braking or rapid acceleration between the current driver and the existing driver, whether the driving pattern of the current driver matches the driving pattern of the existing driver.

7. The vehicle occupant check method according to claim 1, further comprising checking, through a difference in driving route between the current driver and the existing driver, whether the driving pattern of the current driver matches the driving pattern of the existing driver.

8. The vehicle occupant check method according to claim 1, wherein a possibility of detecting the vehicle occupant is greater in the second condition than in the first condition.

9. A vehicle comprising:

a detection sensor configured to detect whether a vehicle occupant is present inside a vehicle; and a controller configured to:

check whether the vehicle occupant is inside the vehicle, based on a first condition, comprising checking a presence of the vehicle occupant inside the vehicle through a detection sensor, when:

a current driver of the vehicle matches an existing driver; and a driving pattern of the current driver matches a driving pattern of the existing driver; and check whether the vehicle occupant is inside the vehicle based on a second condition, comprising checking the presence of the vehicle occupant inside the vehicle through the detection sensor, when:

the current driver of the vehicle does not match the existing driver; or the driving pattern of the current driver does not match the driving pattern of the existing driver, wherein a sensitivity of the detection sensor in the second condition is higher than a sensitivity of the detection sensor in the first condition, wherein checking the presence of the vehicle occupant based on the first condition is performed in a state in which a door of the vehicle is locked after a door opening check of the vehicle is performed, and wherein checking the presence of the vehicle occupant based on the second condition is performed in a state in which the door opening check of the vehicle is performed.

10. The vehicle according to claim 9, wherein the controller is configured to check whether the current driver matches the existing driver through a specific setting for each driver registered in a memory system of the vehicle.

11. The vehicle according to claim 9, wherein the controller is configured to check whether the current driver matches the existing driver through biometric information for each driver registered in a biometric recognition device of the vehicle.

12. The vehicle according to claim 9, wherein the controller is configured to check whether the driving pattern of the current driver matches the driving pattern of the existing driver through a difference in driving time between the current driver and the existing driver.

13. The vehicle according to claim 9, wherein the controller is configured to check whether the driving pattern of the current driver matches the driving pattern of the existing driver through a difference in driving speed between the current driver and the existing driver.

14. The vehicle according to claim 9, wherein the controller is configured to check whether the driving pattern of the current driver matches the driving pattern of the existing driver through a difference in a number of sudden braking or rapid acceleration between the current driver and the existing driver.

15. The vehicle according to claim 9, wherein the controller is configured to check whether the driving pattern of the current driver matches the driving pattern of the existing driver through a difference in driving route between the current driver and the existing driver.

16. The vehicle according to claim 9, wherein a possibility of detecting the vehicle occupant is greater in the second condition than in the first condition.

* * * * *